United States Patent
Santhar et al.

(10) Patent No.: US 12,094,448 B2
(45) Date of Patent: Sep. 17, 2024

(54) GENERATING AUDIO FILES BASED ON USER GENERATED SCRIPTS AND VOICE COMPONENTS

(71) Applicant: International Business Machines Corporation, Armonk, NY (US)

(72) Inventors: Sathya Santhar, Chennai (IN); Samuel Mathew Jawaharlal, Chennai (IN); Sridevi Kannan, Chennai (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 17/511,374

(22) Filed: Oct. 26, 2021

(65) Prior Publication Data
US 2023/0125543 A1    Apr. 27, 2023

(51) Int. Cl.
*G10L 13/033* (2013.01)
*G06F 16/34* (2019.01)
(Continued)

(52) U.S. Cl.
CPC .......... *G10L 13/086* (2013.01); *G06F 16/345* (2019.01); *G06F 40/279* (2020.01); *G10L 13/10* (2013.01)

(58) Field of Classification Search
CPC ....... G06F 40/40; G06F 40/51; G10L 13/033; G10L 13/08; G10L 15/16; G10L 21/10; G10L 21/105; G10L 2021/105
(Continued)

(56) References Cited

U.S. PATENT DOCUMENTS

| 10,186,251 | B1* | 1/2019 | Mohammadi | G10L 13/047 |
| 10,339,973 | B2* | 7/2019 | Jin | G06F 40/58 |

(Continued)

FOREIGN PATENT DOCUMENTS

| CN | 109119063 A | | 1/2019 | |
| GB | 2 101 795 | * | 7/1983 | G11B 27/00 |

(Continued)

OTHER PUBLICATIONS

Anonymous, "Automatic Dubbing of Videos with Multiple Speakers," IP.com Prior Art Database Technical Disclosure, No. IPCOM000256727D, Dec. 26, 2018, 8 pages.
(Continued)

*Primary Examiner* — Martin Lerner
(74) *Attorney, Agent, or Firm* — Zilka-Kotab, P.C.

(57) ABSTRACT

A computer-implemented method, according to one embodiment, includes: determining whether a predetermined version of a source script is available. In response to determining that a predetermined version of the source script is available, it is used to condition a first processor, and instructions are sent to the conditioned first processor to generate a translated copy of the source script by translating the words in the source script from a source language to a target language. Instructions are also sent to a second processor to determine a distribution of metrics associated with the speech of each of the actors in the source audio file. The distributions are used to condition a third processor, and instructions are sent to the conditioned third processor to generate an audio file that includes words spoken in the target language. Furthermore, instructions are sent to merge the generated audio file with the video file.

19 Claims, 10 Drawing Sheets

(51) Int. Cl.
*G06F 40/279* (2020.01)
*G06F 40/40* (2020.01)
*G10L 13/08* (2013.01)
*G10L 13/10* (2013.01)

(58) Field of Classification Search
USPC .......................... 704/2, 9, 232, 260, 269, 8
See application file for complete search history.

(56) References Cited

U.S. PATENT DOCUMENTS

| | | | | |
|---|---|---|---|---|
| 10,657,972 | B2* | 5/2020 | Hall | G06F 40/221 |
| 10,699,705 | B2* | 6/2020 | Li | G06N 3/08 |
| 10,878,819 | B1* | 12/2020 | Chavez | G10L 15/25 |
| 10,930,263 | B1 | 2/2021 | Mahyar | |
| 11,195,507 | B2* | 12/2021 | Kumar | G06F 40/30 |
| 11,514,948 | B1* | 11/2022 | Nair | G06F 40/58 |
| 11,830,476 | B1 | 11/2023 | Karanasou | G10L 13/10 |
| 2002/0097380 | A1* | 7/2002 | Moulton | G11B 27/10 |
| | | | | 352/5 |
| 2002/0161578 | A1* | 10/2002 | Saindon | G06F 40/58 |
| | | | | 704/235 |
| 2006/0069567 | A1* | 3/2006 | Tischer | G10L 13/033 |
| | | | | 704/260 |
| 2008/0195386 | A1* | 8/2008 | Proidl | G10L 13/033 |
| | | | | 704/235 |
| 2009/0204401 | A1* | 8/2009 | Bu | G10L 13/10 |
| | | | | 704/277 |
| 2011/0238407 | A1* | 9/2011 | Kent | G10L 15/26 |
| | | | | 704/3 |
| 2012/0173235 | A1* | 7/2012 | Mountain | G10L 15/26 |
| | | | | 704/235 |
| 2014/0365200 | A1* | 12/2014 | Sagie | G10L 15/32 |
| | | | | 704/2 |
| 2016/0021334 | A1* | 1/2016 | Rossano | G10L 13/033 |
| | | | | 704/2 |
| 2016/0042766 | A1* | 2/2016 | Kummer | G10L 21/00 |
| | | | | 386/285 |
| 2016/0098395 | A1* | 4/2016 | DuBose | G06F 40/58 |
| | | | | 704/2 |
| 2017/0364512 | A1* | 12/2017 | Han | G10L 13/02 |
| 2018/0232363 | A1* | 8/2018 | Jin | G06F 40/58 |
| 2020/0042601 | A1* | 2/2020 | Doggett | G06F 40/58 |
| 2020/0058289 | A1* | 2/2020 | Gabryjelski | G10L 13/00 |
| 2020/0135226 | A1* | 4/2020 | Mittal | G10L 21/10 |
| 2020/0211565 | A1* | 7/2020 | Dubinsky | G10L 13/08 |
| 2020/0286485 | A1* | 9/2020 | Steelberg | G10L 15/063 |
| 2021/0174784 | A1* | 6/2021 | Min | G06F 40/30 |
| 2021/0224319 | A1* | 7/2021 | Ingel | G06F 40/40 |
| 2021/0407510 | A1* | 12/2021 | Wang | G10L 15/25 |
| 2022/0092272 | A1* | 3/2022 | Swift | G06F 40/58 |
| 2022/0245364 | A1* | 8/2022 | Lee | G10L 13/027 |
| 2022/0253715 | A1* | 8/2022 | Ray | G06F 40/30 |
| 2023/0093405 | A1* | 3/2023 | Santhar | G10L 21/10 |
| | | | | 704/260 |

FOREIGN PATENT DOCUMENTS

| | | | | | |
|---|---|---|---|---|---|
| GB | | 2 601 162 | * | 5/2022 | G06T 13/40 |
| WO | WO-2019164535 | A1 | * | 8/2019 | G06F 40/30 |
| WO | WO-2023018405 | A1 | * | 2/2023 | G10L 13/02 |

OTHER PUBLICATIONS

Jalalifar et al., "Speech-Driven Facial Reenactment Using Conditional Generative Adversarial Networks," arXiv, 2018, 12 pages, retrieved from https://arxiv.org/pdf/1803.07461.pdf.

Prajwal et al., "Towards Automatic Face-to-Face Translation," arXiv, 2020, 9 pages, retrieved from https://arxiv.org/pdf/2003.00418.pdf.

* cited by examiner

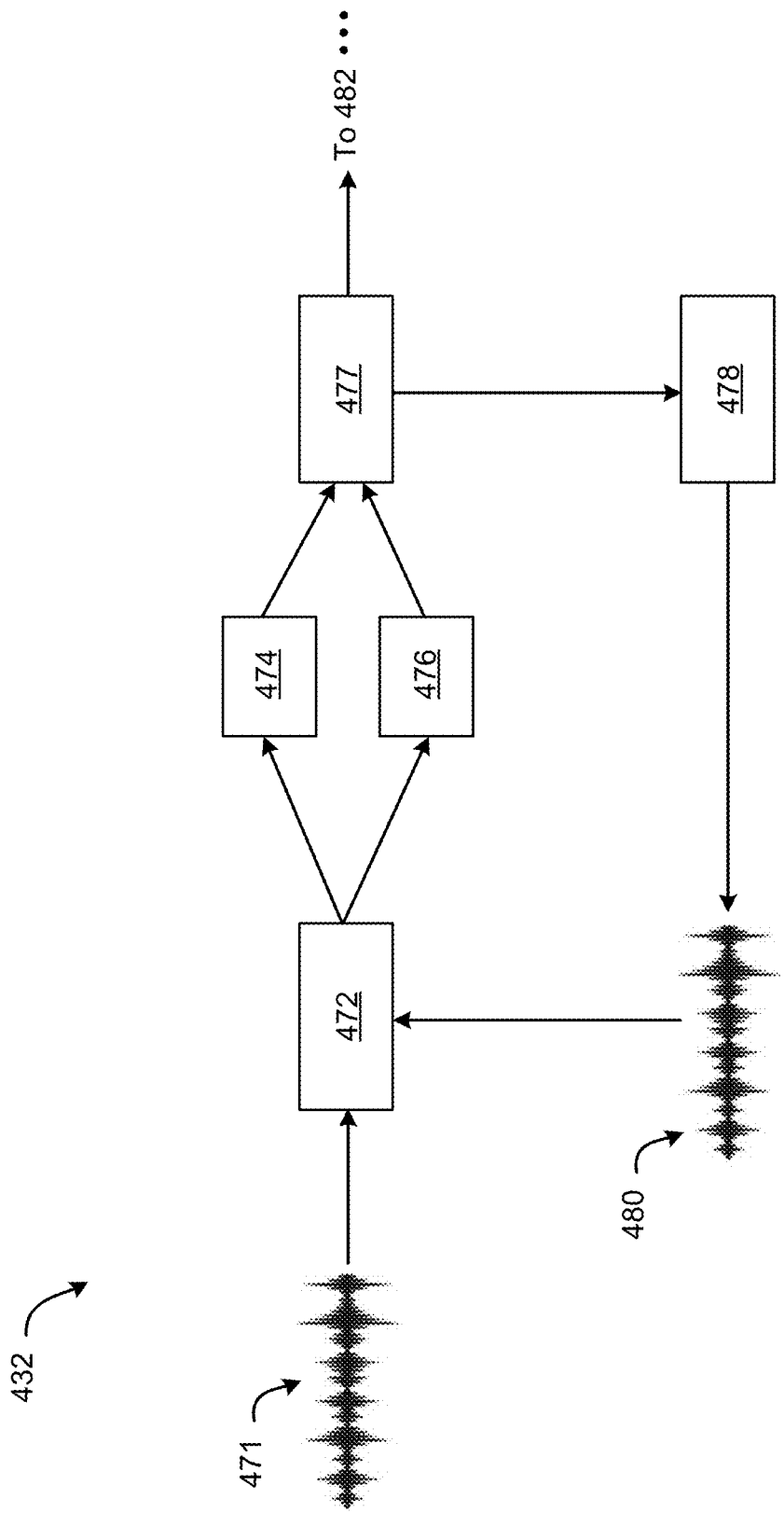

GENERATING AUDIO FILES BASED ON USER GENERATED SCRIPTS AND VOICE COMPONENTS

BACKGROUND

The present invention relates to audio and video files, and more specifically, this invention relates to generating audio files that correspond to existing video files.

Various types of videos including cinema, sports, educational broadcasts, etc., have been made available in different languages which has largely been made possible through the process of dubbing. While some videos rely on subtitles to bridge the gap to a language other than the one the videos were originally filmed in, many audiences prefer hearing the dialogue in the video in their native language. Accordingly, dubbing achieves this desired feature by performing a post-production process where an original recording language is swapped with audio that is in a different language, and is then mixed with the background audio of the media to make it sound as natural as possible.

While this process seems straightforward, it is important to note that even the most experienced filmmaking professionals cannot dub a film on their own. It is an involved process that requires the expertise of several experts. So, for any filmmaker who might desire dubbing services for a given project, the first step in conventional approaches involves collaborating with the appropriate professionals. For instance, when a foreign language is dubbed, the translation of the original dialogue is carefully matched to the lip movements of the actors in the actual video. In fact, conventional dubbing processes are resource intensive and involve various steps that introduce significant latency to these conventional implementations.

SUMMARY

A computer-implemented method, according to one embodiment, includes: determining whether a predetermined version of a source script is available, where words in the source script are in a source language and words in the predetermined version of the source script are in a target language. The predetermined version of the source script also identifies specific ones of the words in the predetermined version that are to be retained in a generated script. It should also be noted that the words in the source script directly correspond to words spoken by actors in a source audio file, and the source audio file corresponding to a video file. In response to determining that a predetermined version of the source script is available, the predetermined version of the source script is used to condition a first processor, and one or more instructions are sent to the conditioned first processor to generate a translated copy of the source script by translating the words in the source script from the source language to the target language. One or more instructions are also sent to a second processor to determine a distribution of one or more metrics associated with the speech of each of the actors in the source audio file. The distributions are used to condition a third processor, and one or more instructions are sent to the conditioned third processor to generate an audio file that includes words spoken in the target language. The audio file is generated such that the words spoken therein directly correspond to words in the generated translated copy of the source script. Furthermore, one or more instructions are sent to merge the generated audio file with the video file.

A computer program product, according to another embodiment, includes a computer readable storage medium having program instructions embodied therewith. The program instructions are readable and/or executable by a processor to cause the processor to: perform the foregoing method.

A system, according to yet another embodiment, includes: a processor, and logic integrated with the processor, executable by the processor, or integrated with and executable by the processor. Moreover, the logic is configured to: perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
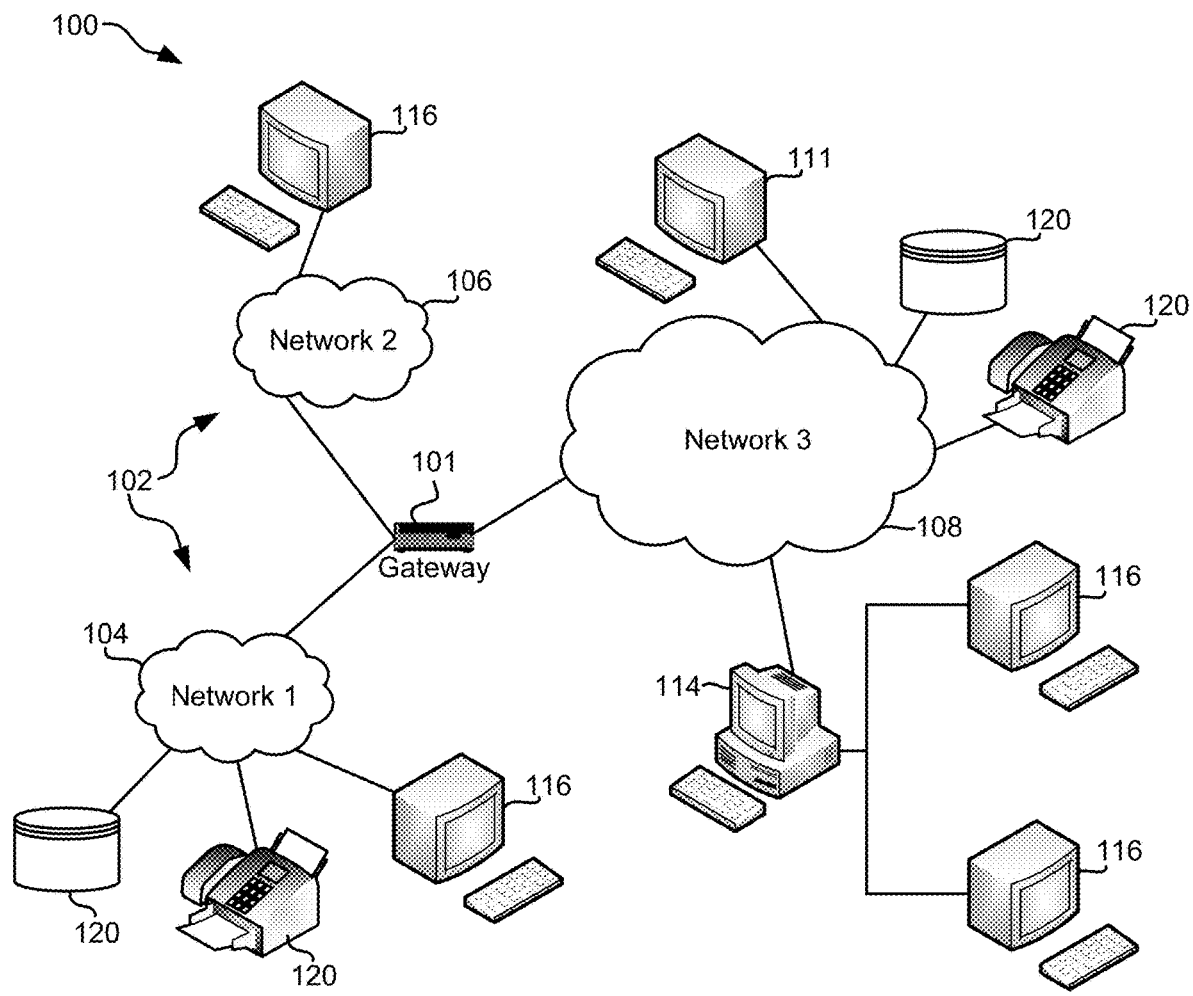
FIG. 1 is a diagram of a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for significantly improving the efficiency and accuracy by which a given video can be dubbed in a target language. This is achieved at least in part by translating the source language into the target language with proper usage of the source language vocabulary as desired without losing its linguistic and speech metrics. This in turn leads to the accurate generation of a dubbed film that has the selected vocabulary of the target language with desirable lip sync conditioned on a user's predefined vocabulary. It follows that various ones of the approaches included herein implement a language translation and speech synthesis process which produces a desirable translated audio script that is conditioned using a predetermined script as well as speech metrics, e.g., as will be described in further detail below.

In one general embodiment, a computer-implemented method includes: determining whether a predetermined version of a source script is available, where words in the source script are in a source language and words in the predetermined version of the source script are in a target language. The predetermined version of the source script also identifies specific ones of the words in the predetermined version that are to be retained in a generated script. It should also be noted that the words in the source script directly correspond to words spoken by actors in a source audio file, and the source audio file corresponding to a video file. In response to determining that a predetermined version of the source script is available, the predetermined version of the source script is used to condition a first processor, and one or more instructions are sent to the conditioned first processor to generate a translated copy of the source script by translating the words in the source script from the source language to the target language. One or more instructions are also sent to a second processor to determine a distribution of one or more metrics associated with the speech of each of the actors in the source audio file. The distributions are used to condition a third processor, and one or more instructions are sent to the conditioned third processor to generate an audio file that includes words spoken in the target language. The audio file is generated such that the words spoken therein directly correspond to words in the generated translated copy of the source script. Furthermore, one or more instructions are sent to merge the generated audio file with the video file.

In another general embodiment, a computer program product includes a computer readable storage medium having program instructions embodied therewith. The program instructions are readable and/or executable by a processor to cause the processor to: perform the foregoing method.

In yet another general embodiment, a system includes: a processor, and logic integrated with the processor, executable by the processor, or integrated with and executable by the processor. Moreover, the logic is configured to: perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
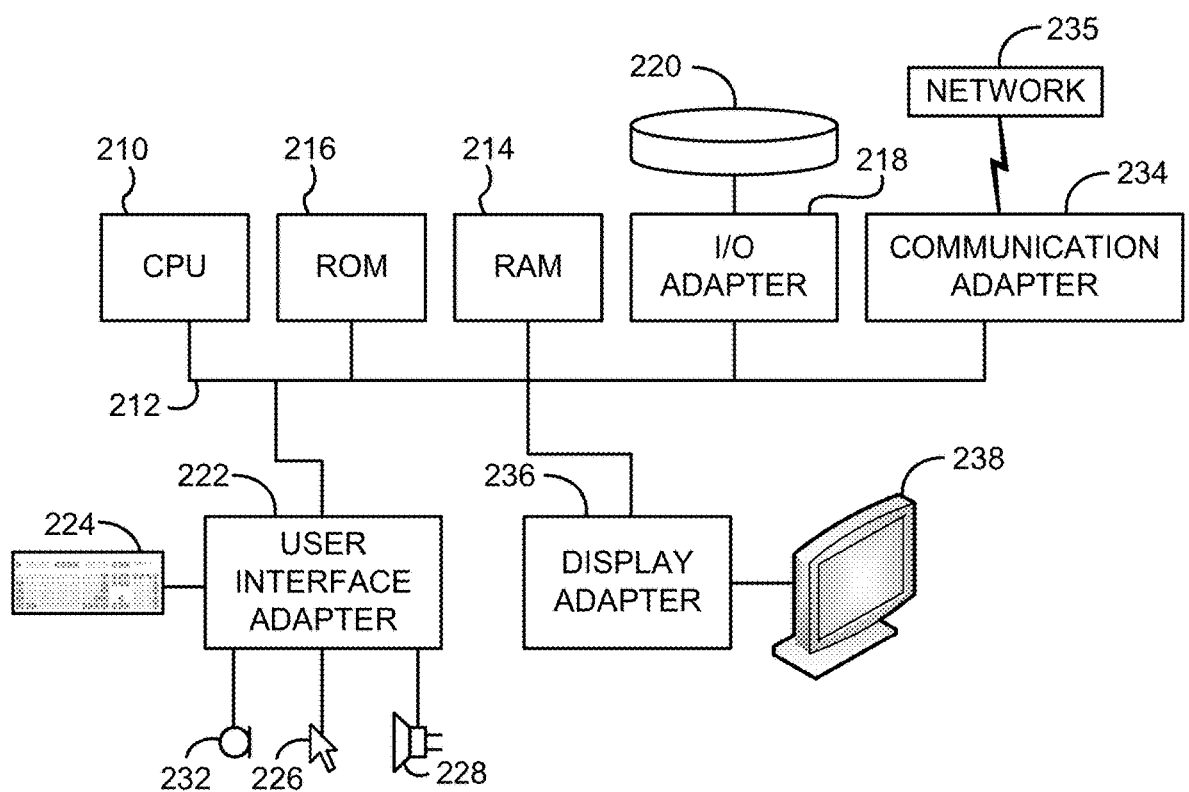
FIG. 2 is a diagram of a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
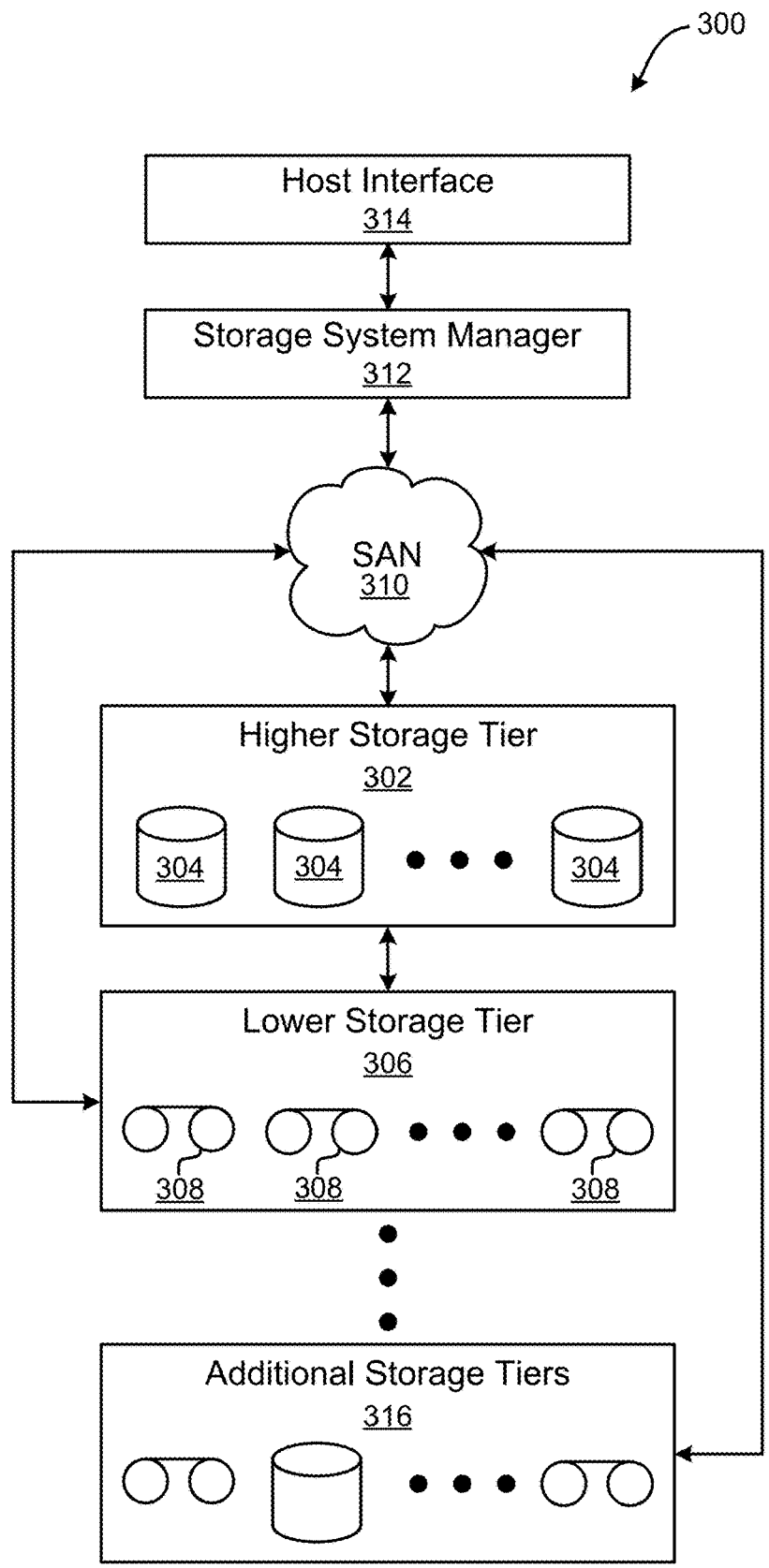
FIG. 3 is a diagram of a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As noted above, while the process of dubbing a given video seems straightforward, it is important to note that even the most experienced filmmaking professionals cannot dub a film on their own. It is an involved process that requires the expertise of several experts. So, for any filmmaker who might desire dubbing services for a given project, the first step in conventional approaches involves collaborating with the appropriate professionals. For instance, when a foreign language is dubbed, the translation of the original dialogue is carefully matched to the lip movements of the actors in the actual video. In fact, conventional dubbing processes are resource intensive and involve various steps that introduce significant latency to these conventional implementations.

Some existing systems are actually only able to translate audio-visual content at a speech-to-speech level and thereby have major drawbacks, including poor voice style and unsynchronized lip movements. Natural looking lip animation has also proven to be a challenging problem for conventional implementations since viewers are sensitive to even slight errors in the animation of the human face.

In sharp contrast to these conventional shortcomings that have been experienced, various ones of the embodiments included herein are able to significantly improve the efficiency and accuracy by which a given video can be dubbed. Moreover, users are given the opportunity to provide input such that the resulting dubbed video is selectively created based on the user's specific preferences, e.g., as will be described in further detail below.

Figure 4A:
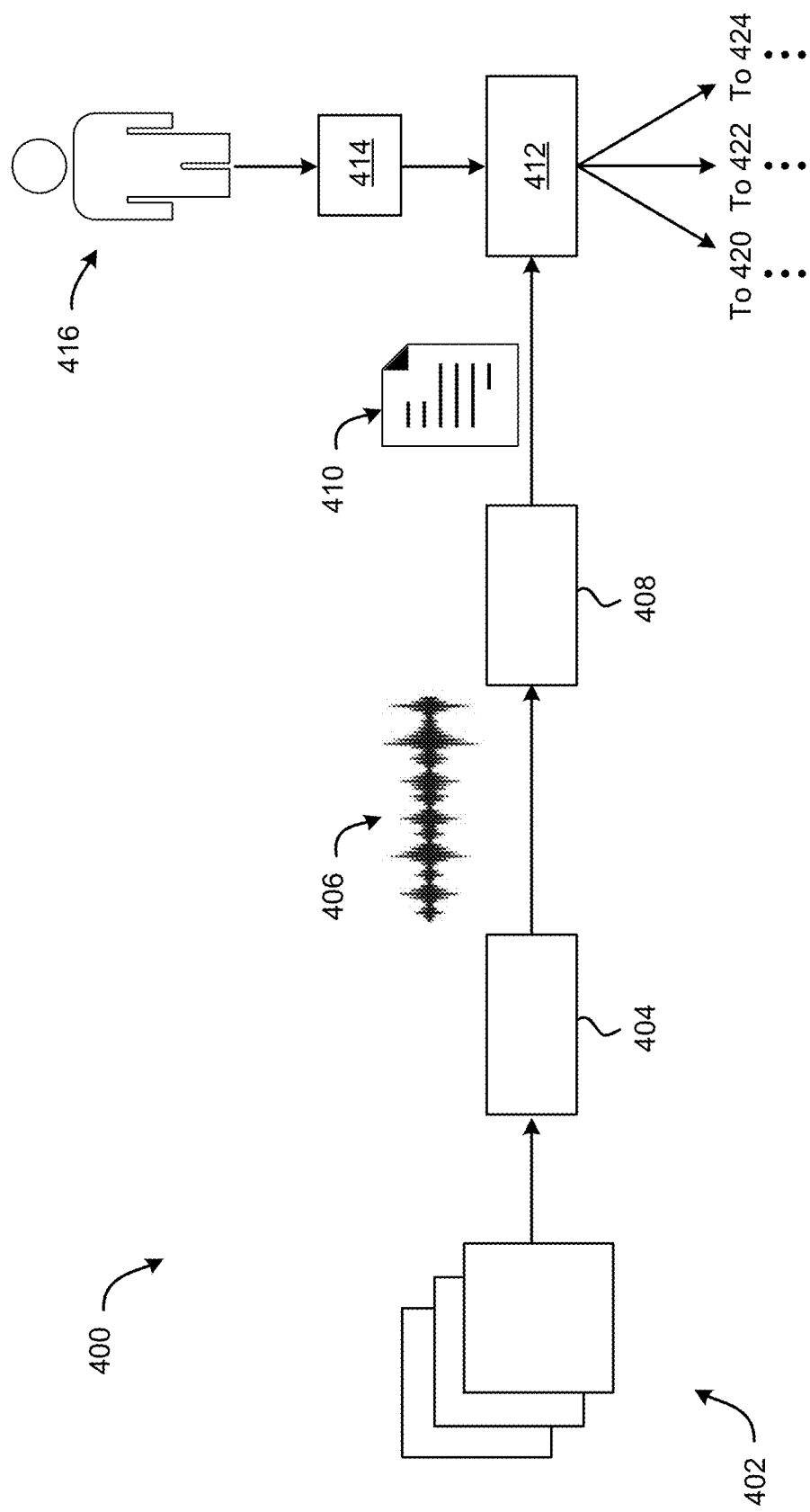
FIG. 4A is a partial representational view of a translation system, in accordance with one embodiment.
Figure 4A:
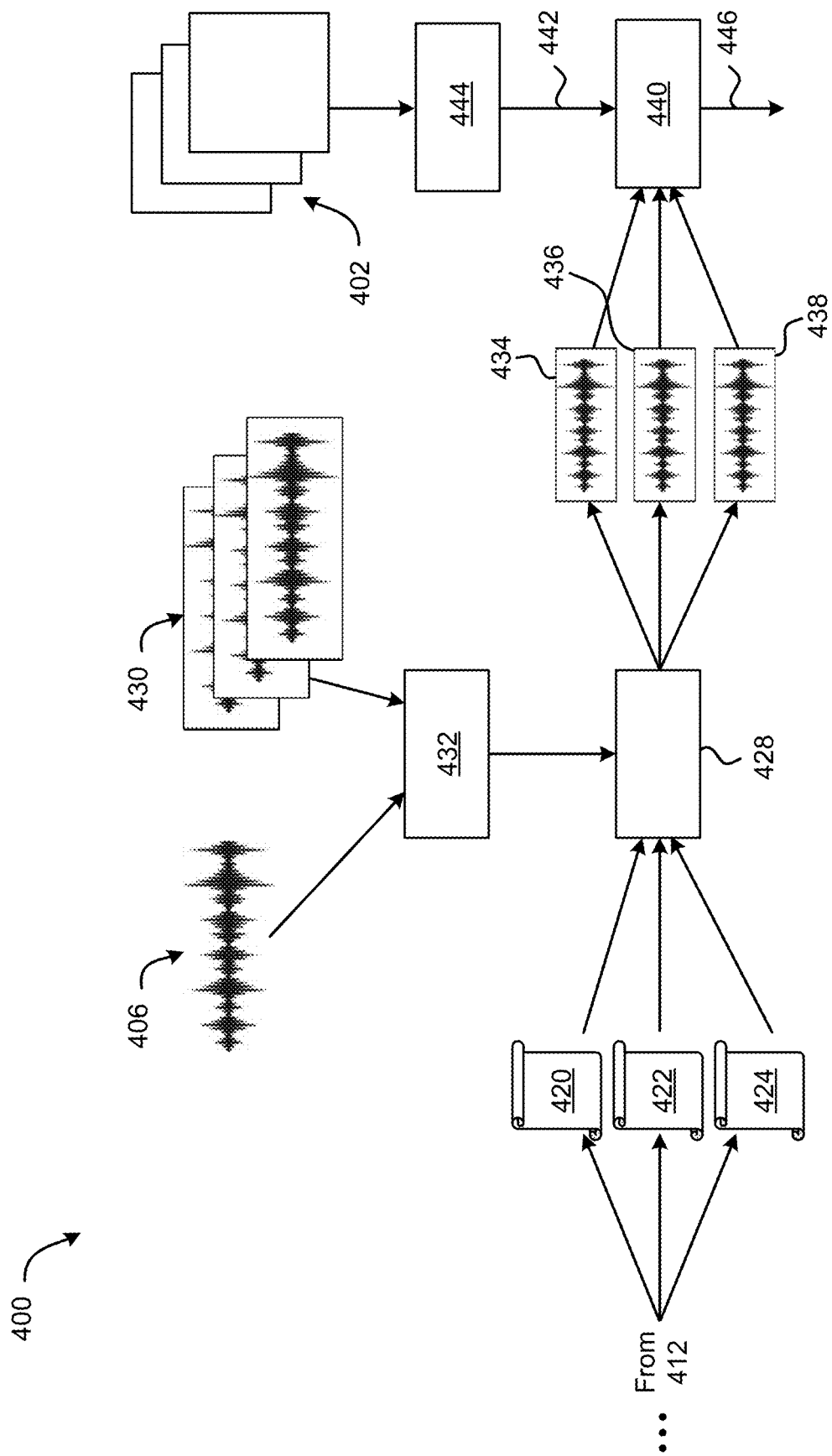

Looking now to FIG. 4A, a representational depiction of a translation system 400 is shown in accordance with one embodiment. As an option, the present translation system 400 may be implemented in conjunction with features from any other embodiment listed herein, such as those described with reference to the other FIGS., such as FIGS. 5A-5B. However, such translation system 400 and others presented herein may be used in various applications and/or in permutations which may or may not be specifically described in the illustrative embodiments listed herein. Further, the translation system 400 presented herein may be used in any desired environment. Thus FIG. 4A (and the other FIGS.) may be deemed to include any possible permutation.

As shown, the translation system 400 includes various components, one or more of which may be used in the process of creating a dubbed version of a film. As mentioned above, a film typically includes a video file and an audio file which are synchronously combined. It follows that different audio files may be combined with the original video file to produce films that incorporate a different spoken language. With respect to the present description, it should be noted that "film" is intended to refer to a corresponding pair of video and audio files.

Accordingly, the source film 402 includes a video file as well as an audio file that are synchronously combined. The source film 402 is passed to an audio extraction module 404 which is able to extract the source audio file 406 from the source film 402. In some approaches the audio extraction module 404 extracts the source audio file 406 from the source film 402 by inspecting a source file and creating a copy of the audio file included therein.

The source audio file 406 is passed to an automatic speech recognition (ASR) module 408 which is preferably able to convert the source audio file 406 into source text 410. It follows that it is desirable the words in the source text 410 directly correspond to the words that are spoken in the source audio file 406. In other words, the ASR module 408 is preferably able to generate an accurate textual representation of the words which are spoken in the source audio file of the source film, and which correspond to the lip movements of the actors in the source video file of the source film. In some approaches the ASR module 408 is able to convert the sounds in the source audio file 406 into the source text 410 using any desired type of speech-to-text algorithms, computer processing, etc.

With continued reference to FIG. 4A, the source text 410 is passed to a neural machine translation (NMT) module 412. The NMT module 412 may be a subfield of computational linguistics that is focused on translating text from one language to another. For instance, the NMT module 412 may be used to convert the words in the source text 410 from a source language to a target language. It follows that in some approaches, the NMT module may be used to perform one or more of the processes described below in method 500 (e.g., see 504 and/or 506 of FIG. 5A).

The NMT module 412 may even be able to include some additional enhancements to the resulting translated text to achieve a desired result of conditional translation. For instance, the NMT module 412 may be able to further enhance the translated scripts by focusing on word level refinement. Accordingly, the NMT module 412 is also depicted as receiving a predetermined version 414 of the source text 410 from a user 416. The predetermined version 414 includes information that identifies certain aspects that are to be included in translated copies of the source text 410 formed by the NMT module 412.

For example, the predetermined version 414 may identify specific words and/or phrases in the target language that are to be used in each of the potential translated copies that are generated by the NMT module 412 (e.g., see 420, 422, 424 below). In other situations, predetermined version 414 may identify specific accents and/or slang in the target language that are to be used in each of the potential translated copies that are generated. In some approaches, these certain aspects identified in the predetermined version 414 may be identified using start and stop tokens which act as flags calling out the specific aspects, e.g., as would be appreciated by one skilled in the art after reading the present description. For instance, a binary flag may be used as a conditioning element which would indicate whether sampled words can be modified by a language translation system. Accordingly, if the binary flag is not set, the sampled words are retained as immutable words till the end of the translation process.

Figure 4B:
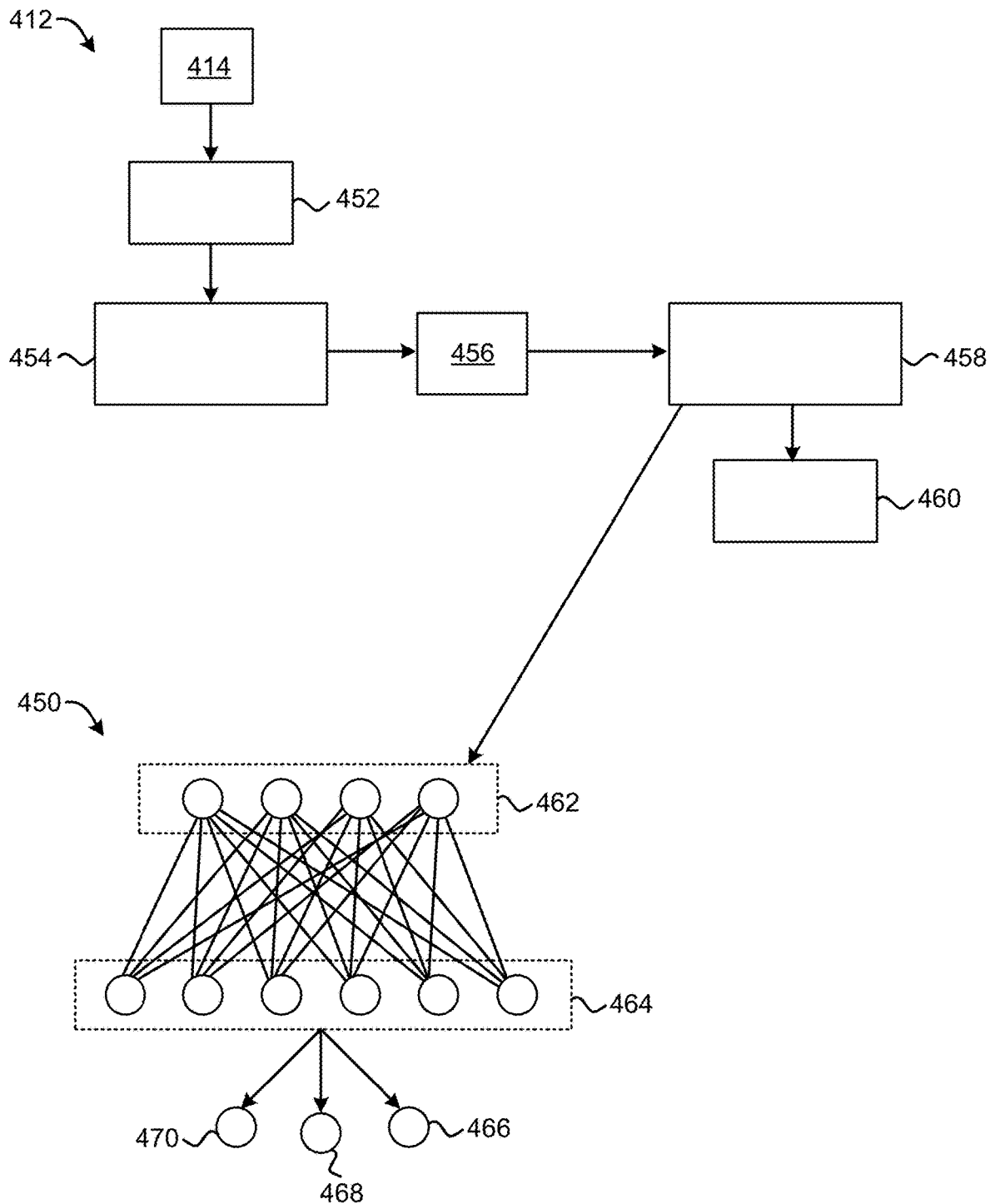
FIG. 4B is a partial detailed view of the NMT module in FIG. 4A, in accordance with one embodiment.

Referring momentarily to FIG. 4B, a detailed view of the NMT module 412 in FIG. 4A is depicted in accordance with one embodiment, which is in no way intended to limit the invention. As shown, the NMT module 412 is coupled to a neural network 450 which may be used to determine a beam width to apply in situations where input is not received from a user, e.g., as will be described in further detail below.

Looking specifically to the NMT module 412, the predetermined version 414 of the source text is provided to an input vector module 452 which transforms the information in the predetermined version 414 before transferring it to the encoder 454. Although not shown, the encoder 454 includes a number of recurrent neural networks (RNNs), each of which processes a different portion of the transformed information from the predetermined version 414.

The output from the encoder 454 is thereby passed to an encoder vector module 456 before being transferred to a decoder 458. Like the encoder 454, the decoder 458 includes a number of RNNs, each of which are used to form a different portion of the resulting information. The information in the decoder 458 from each timestamp is passed to the neural network 450 as an input layer 462, and this information is further processed in a hidden layer 464 to produce a number of potential user conditioned translated scripts 466, 468, 470 as shown. While three potential user conditioned translated scripts 466, 468, 470 are shown as being produced, the beam width may be set at two. As a result, the two of the potential user conditioned translated scripts 466, 468, 470 determined as being a closer match to the actors' movements in the source video file may be retained, while the remaining one of the potential user conditioned translated scripts is discarded, saved in memory, invalidated, etc.

The information output from the decoder 458 and passed to the output vector module 460 may thereby identify the two scripts 466, 468, 470 determined as being a closer match to the actors' movements in the source video file. The output vector module 460 may thereby be used to evaluate and output the two scripts as potential copies of the source text.

Thus, by conditioning the NMT module 412 with both the source text 410 and the predetermined version 414 of the source text, the NMT module 412 is able to translate the words in the source text 410 from the source language to a target language such that the produced translation includes desired aspects identified by a user in the predetermined version 414. This is desirable, as it enables a user (e.g., script writer, director, viewer/consumer, actor, running application, etc.) to specify certain attributes that should be maintained in any produced translations, thereby resulting in a final film that has specific characterizations, e.g., uses specific words and/or phrases to deliver a specific performance. For instance, in some situations where a predetermined (e.g., pre-written) script in the target language is available, the artistic vocabulary and the native cultural ideas may be retained in the translations.

The user is also preferably able to determine the number of translated copies that are formed by the NMT module 412 for the source text 410. With respect to the present description, it should be noted that this number of translated copies that are formed by the NMT module 412 for a given source text is also referred to herein as a beam width.

By adjusting the beam width, and thereby the number of translated copies that are formed, the accuracy by which a resulting translation of the source text matches the lip movements of the actors in the video file is improved. While the audio file may be re-recorded in a different language and resynchronized with the video file, the actual movements of the actors (e.g., lip movements, body language, etc.) in the video file cannot be changed to accommodate the translated audio file. It follows that certain translations of the source text will result in spoken words that more closely match the corresponding lip movements of the actors in the video file.

According to the present embodiment, the beam width is set to 3 by a user (e.g., 416), thereby resulting in 3 different potential translated copies 420, 422, 424 of the source text 410 being generated while also incorporating the predetermined version 414 of the source text. The different potential translated copies 420, 422, 424 are formed in some approaches by translating the source text 410 from the source language to the target language at least slightly differently three separate times. In some approaches, each of the potential translated copies 420, 422, 424 of the source text 410 are formed by applying a beam search algorithm. This algorithm may be used to identify the best and most likely translated word such that a word in the target language is selected with the greatest probability based on the context in the source script. For instance, multiple alternatives for an input sequence may be selected at each timestep based on conditional probability and beam width selected, e.g., as would be appreciated by one skilled in the art after reading the present description.

According to an example, each potential translated copy that is generated may translate a word in the source language to different synonyms in the target language. According to another example, each potential translated copy may translate a phrase in the source language into a different phrase, each of the different phrases being synonymous with each other. However, in some approaches the beam width may actually be a learnable parameter. In other words, the beam width can be a learnable parameter which is tuned in the training process, e.g., based on past iterations, learned patterns, supplemental information, etc.

Referring still to translation system 400, the potential translated copies 420, 422, 424 are passed to a text to speech (TTS) module 428. The TTS module 428 is preferably conditioned using probability distributions of various metrics that are associated with the speech of each of the actors in the source audio file 406. The TTS module 428 may also be conditioned using probability distributions of various metrics which correspond to previous recordings (e.g., other audio recordings from past films) of the same actors that are in the source film. Accordingly, the source audio file 406 and/or previously recorded audio files 430 of the same actors that are in the source film are compiled and evaluated by the variational auto encoder (VAE) 432.

The VAE 432 is preferably able to provide a probabilistic manner for describing an observation in latent space. Thus, rather than building an encoder which outputs a single value to describe each latent state attribute (e.g., as seen in conventional implementations), an encoder of the VAE 432 is formulated to describe a probability distribution for each desired speech metric. In other words, the VAE 432 is able to determine a probability distribution for each of one or more metrics associated with the speech of each of the actors in the source audio file. Moreover, these previously recorded audio files 430 may correspond to past films, deleted takes, previous auditions, etc.

The VAE 432 may actually include and/or be part of an auto encoder network having a pair of connected networks, one having an encoder, and the other a decoder. The encoder network is thereby able to take an input (e.g., a dataset of the corresponding actor's speech metrics) with the encoding dimensions equal thereto. The VAE 432 is thereby trained with the input and converts it into a continuous, smaller, dense representation.

The encoder of VAE 432 thereby is able to output 2 vectors of size n, one of the vectors having mean values "µ", and another vector having standard deviation values "σ." With this approach, each latent attribute is represented for a given input as a probability distribution. Moreover, when decoding from the latent state, each latent state distribution is randomly sampled to generate a vector as input for a decoder model. The decoder network uses this sampling of the latent distributions to accurately reconstruct the original distribution of the input.

It should also be noted that two types of losses are considered while backpropagating during the conditioning process of the VAE 432. A first type of losses includes reconstruction losses, where the loss function is usually either the mean-squared error or cross-entropy between the output and the input. Moreover, a second type of losses include Kullback—Leibler divergence losses, where the loss function determines the difference between the input and output probability distributions. The VAE 432 is also able to learn the voice components like intensity, pitch, tone, etc., in the form of compressed latent attributes represented by a range of possibilities. The VAE 432 is thereby able to accurately reconstruct for any sample taken from the latent state distributions.

It follows that by evaluating different metrics associated with speech of the actors, e.g., such as intensity, pitch, tone, etc., the VAE 432 is formulated to describe a probability distribution for each desired speech metric. The VAE 432 is thereby able to explain these metrics in probabilistic terms so that an accurate reconstruction for any sample taken from latent state distributions is possible when producing the resulting film that is output. These probability distributions that are formulated are provided to the TTS module 428 as shown.

The TTS module 428 is thereby able to utilize these distributions at least somewhat differently to generate potential audio files 434, 436, 438 which mimic certain metrics of the source audio file 406, in addition to the underlying contextual message. Moreover, each of the potential audio files 434, 436, 438 correspond to a different one of the potential translated copies 420, 422, 424 of the source text 410 previously generated by the NMT module 412. In other words, each of the potential audio files 434, 436, 438 include audible representations of the textual information included in the respective potential translated copies 420, 422, 424.

The conditioned TTS module 428 thereby generates a same number of potential audio files 434, 436, 438 as the number of potential translated copies 420, 422, 424 of the source text 410 that are generated. Each of the potential audio files 434, 436, 438 are further passed to an evaluation module 440. The source video file represented by arrow 442 is also extracted from the source film 402 by a video extraction module 444 before being passed to the evaluation module 440.

In some approaches, the evaluation module 440 is able to examine each of the potential audio files 434, 436, 438 by synchronizing the source video file therewith, and assessing how closely the lip movements of the actors in the source video file match the words spoken by the actors in each of the potential audio files 434, 436, 438. As mentioned above, natural looking lip synchronization is desirable as viewers are sensitive to even slight mismatches between movements of the human face while speaking and the corresponding words in the audio file. Again, while the audio file may be re-recorded in a different language and resynchronized with the source video file, the actual movements of the actors (e.g., lip movements, body language, etc.) in the source video file cannot be changed to accommodate the translated audio file. It follows that certain translations of the source text will result in spoken words that more closely match the corresponding lip movements of the actors in the video file.

It should also be noted that although not depicted in FIG. 4A, the translation system 400 may include an optimized language translation (OLTS) system in some approaches.

Similar to the TTS module 428, the OLTS system is preferably conditioned using various speech metrics such that the translated speech that is generated retains the actors' original voice distributions. As previously mentioned, the probability distribution of the various speech metrics may be formed by the VAE 432. It follows that the sample points taken from the latent space for each of the speech metrics are desirably used to produce the voice of the actor which matches the lip movements of the actors in the source video file. The OLTS system would thereby be able to produce multiple matches between the actors' lip motion and each potential audio file, each of which would have a different lip synchronization score.

A determination may be made (e.g., by the user) as to whether the lip synchronization scores are desirable enough that at least one of the potential audio files sufficiently mirrors the actors' lip movement. In situations where the lip synchronization scores are undesirably poor, a decision may be made to provide the potential audio files to a module that is able to assist in the synthesizing of actor movements in the source video file (e.g., lip movements) with a selected one of the potential audio files. In other words, a LipGAN model may be used to generate natural looking lip movements for the actors in the video file if none of the potential audio files are able to sufficiently synchronize with the movements of the actors in the video file.

Figure 4C:
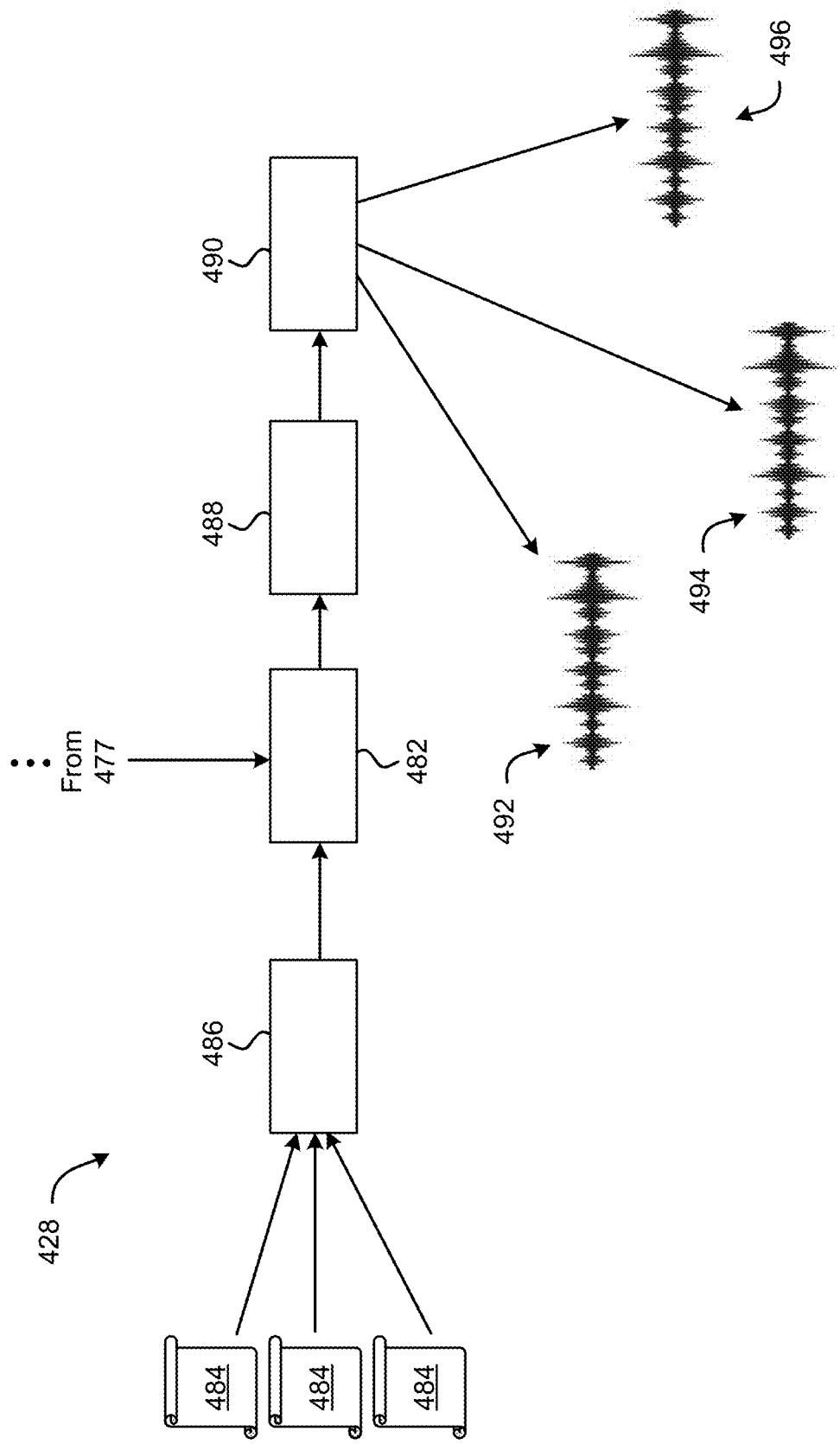
FIG. 4C is a partial detailed view of the VAE and TTS module in FIG. 4A, in accordance with one embodiment.

Referring now to FIG. 4C, a detailed view of the VAE 432 and TTS module 428 in FIG. 4A is depicted in accordance with one embodiment, which is in no way intended to limit the invention. As shown, the VAE 432 and TTS module 428 are coupled to each other. Moreover, looking specifically to the VAE 432, the speech metrics 471 derived from the source audio file and other recordings of the actors' speech are used to condition the VAE 432. A probabilistic encoder 472 is used to determine a mean value 474 as well as the standard deviation value 476 of the one or more speech metrics of the actors. These mean values 474 and standard deviation values 476 may thereby be used to form a compressed, low dimensional representation 477 of the various speech metrics.

While this low dimensional representation 477 of the various speech metrics is passed back to a probabilistic decoder 478 before being used to construct a specific audio file 480 that corresponds to the voices of the actors, in some approaches, the specific audio file 480 may be resubmitted to the probabilistic encoder 472, e.g., such that the specific audio file 480 is processed again by the various components included in the VAE 432. The low dimensional representations 477 are also passed to the TTS module 428. Specifically, the low dimensional representations 477 are passed to a conditioning module 482 in the TTS module 428. It follows that the low dimensional representations 477 are used to condition (e.g., train) the TTS module 428. The TTS module 428 may also be trained using potential translated copies 484 of a source script. As noted above, these potential translated copies 484 may be generated by the NMT module 412 and are passed to a text encoder module 486 before being transitioned to the conditioning module 482.

From the conditioning module 482, the TTS module 428 identifies certain aspects that are to be retained in the potential audio files that are ultimately generated. These aspects are maintained and applied by an attention module 488 in some approaches before reaching a text decoder 490. The text decoder 490 is thereby able to generate a number of potential audio files 492, 494, 496, each of which directly correspond to a respective one of the potential translated copies of the source text. Each of the potential audio files 492, 494, 496 that are generated also retain the desired ones of the actors' speech metrics.

The evaluation module 440 is ultimately able to identify one of the potential audio files 434, 436, 438 as being a closest match to the movements of the actors in the source video file. The identified one of the potential audio files and the synchronized source video file may thereby be combined to produce a resulting film 446 that is dubbed in a desired target language. As a result, the translation system 400 is able to produce films that have been dubbed in different languages much more efficiently and accurately than previously achievable, e.g., as will soon become apparent.

For instance, given a film having an audio file that corresponds to a source language, it is desirable to generate an accurate translated script and corresponding audio file in a target language, provided the script writer's choice of words in the target language are retained along with the original actor's voice component distribution. Looking now to FIG. 5A, a flowchart of a method 500 for producing a film that is dubbed in a target language is shown according to one embodiment. The method 500 may be performed in accordance with the present invention in any of the environments depicted in FIGS. 1-4C, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in some embodiments, one or more of the processes included in method 500 may be performed by a central computing component. In various other embodiments, the method 500 may be partially or entirely performed by a controller, a processor, a computer, etc., or some other device having one or more processors therein. Thus, in some embodiments, method 500 may be a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, decision 502 of method 500 includes determining whether a predetermined version of a source script is available. As noted above, a source film includes a source audio file and a source video file which are synchronized together. Moreover, the words in a source script directly correspond to the words spoken by actors in the source audio file, as well as the lip movements of the actors seen in the source video file. In other words, the source audio file includes audible representations (e.g., spoken words) of the textual representations found in the source script, where the source audio file and source script correspond to a source language.

A predetermined version of a source script (e.g., see 414 of FIG. 4A) may thereby include information which identifies certain aspects that are to be included in translated copies of the source script. For example, the predetermined version of the source script may identify specific words and/or phrases in a target language that are to be used in the process of translating the source language in the source script. This predetermined version of the source script is desirable, as it enables a user (e.g., script writer, director, viewer/consumer, actor, running application, etc.) to specify certain attributes that should be maintained in any produced translations, thereby resulting in a final film that has specific characterizations, e.g., uses specific words and/or phrases to deliver a specific performance. According to another example, the predetermined version of the source script may not be a fully translated copy of the source script, but rather identifies specific ones of the words in the source script that are to be translated into specific ones of the words in the target language.

In response to identifying that a predetermined version of a source script is available, method 500 advances from decision 502 to operation 504, which includes using the predetermined version of the source script to condition a first processor. In other words, the information included in the predetermined version of the source script may be used to train the first processor, preferably such that the first processor is able to actually implement the desired aspects that have been identified in the predetermined version.

In some approaches, the information in the predetermined version of the source script includes specific words and/or phrases in a target language that are to be included in a translation of the source script. However, the information in the predetermined version of the source script may vary depending on the particular approach. For example, in other approaches the information in the predetermined version of the source script may include certain words and/or phrases in the target language that should not be used in the translation of the source script, limits to the number of times certain words and/or phrases may be used in the translation of the source script, etc.

The characteristics of the first processor itself may also vary depending on the particular approach. In some approaches, the first processor may be a NMT module (e.g., see 412 of FIG. 4A) which is able to translate text from a source language into a target language. In other approaches the first processor may be at least a portion of a neural machine translation system. It follows that in some approaches, operation 504 may involve providing the predetermined version of the source script to a neural machine translation system as a conditional input.

Method 500 further proceeds to operation 506 which includes sending one or more instructions to the conditioned first processor to generate one or more potential translated copies of the source script. As noted above, a user may be able to determine the number of potential translated copies of the source script that are formed by adjusting a beam width. The user is thereby given at least some input as to the accuracy by which a resulting translation of the source text matches the lip movements of the actors in the video file. Again, while the audio file may be re-recorded in a different language and resynchronized with the video file, the actual movements of the actors (e.g., lip movements, body language, etc.) in the video file cannot be changed to accommodate the translated audio file. It follows that certain translations of the source text will result in spoken words that more closely match the corresponding lip movements of the actors in the video file.

In some approaches, the process of generating the one or more potential translated copies of the source script involves translating the words in the source script from the source language to the target language at least somewhat differently. By translating the source script at least somewhat differently for each potential translated copy that is formed, the actual words that are included in each of the potential translated copies differ.

For example, each potential translated copy that is generated may translate a word in the source language to different synonyms in the target language. According to another example, each potential translated copy may translate a phrase in the source language into a different phrase, each of the different phrases being synonymous with each other. Again, these differences between the potential translated copies that are formed is desirable as some of the potential translated copies may ultimately result in spoken words (an audio signal) that are a closer match to the lip movement of the actors in the source video which is not re-made.

However, it should be noted that each of the potential translated copies are generated while adhering to the information in the predetermined version of the source script. As noted above, the predetermined version of the source script identifies certain aspects that are to be included in the potential translated copies of the source script. For example, the predetermined version may identify specific words and/or phrases in the target language that are to be included in each of the potential translated copies that are generated. This desirably allows for a user (e.g., script writer, director, viewer/consumer, actor, running application, etc.) to specify certain attributes that should be maintained in any produced translations, thereby ultimately resulting in a final film that has specific characterizations, e.g., uses specific words and/or phrases to deliver a specific performance. It follows that each of the number of potential translated copies of the source script that are generated (e.g., by a NMT module) include the specific ones of the words in the target language that are identified in the predetermined version of the source script.

Referring still to FIG. 5, operation 508 includes sending one or more instructions to a second processor to determine a distribution of one or more metrics associated with the speech of each of the actors in the source audio file. The second processor is different from the first processor in preferred approaches. For example, the first processor may be a text summarizer module or system, e.g., such as a NMT module (see 412 of FIG. 4A). Moreover, the second processor may be a VAE in some approaches (e.g., see 432 of FIG. 4A).

The second processor is thereby preferably able to provide a probabilistic manner for describing an observation in latent space. Thus, the second processor may be formulated to describe a probability distribution for each desired speech metric associated with the speech of each of the actors. Depending on the approach, the speech metrics may include intensity, pitch, tone, etc., or any other desired quantifiable audible attribute. Moreover, the distributions of the one or more metrics associated with the speech of each of the actors may be formed based on additional sample data. For example, the second processor may evaluate audio recordings of the actors other than the source audio file, which may correspond to past films, deleted takes, previous auditions, etc.

Figure 5A:
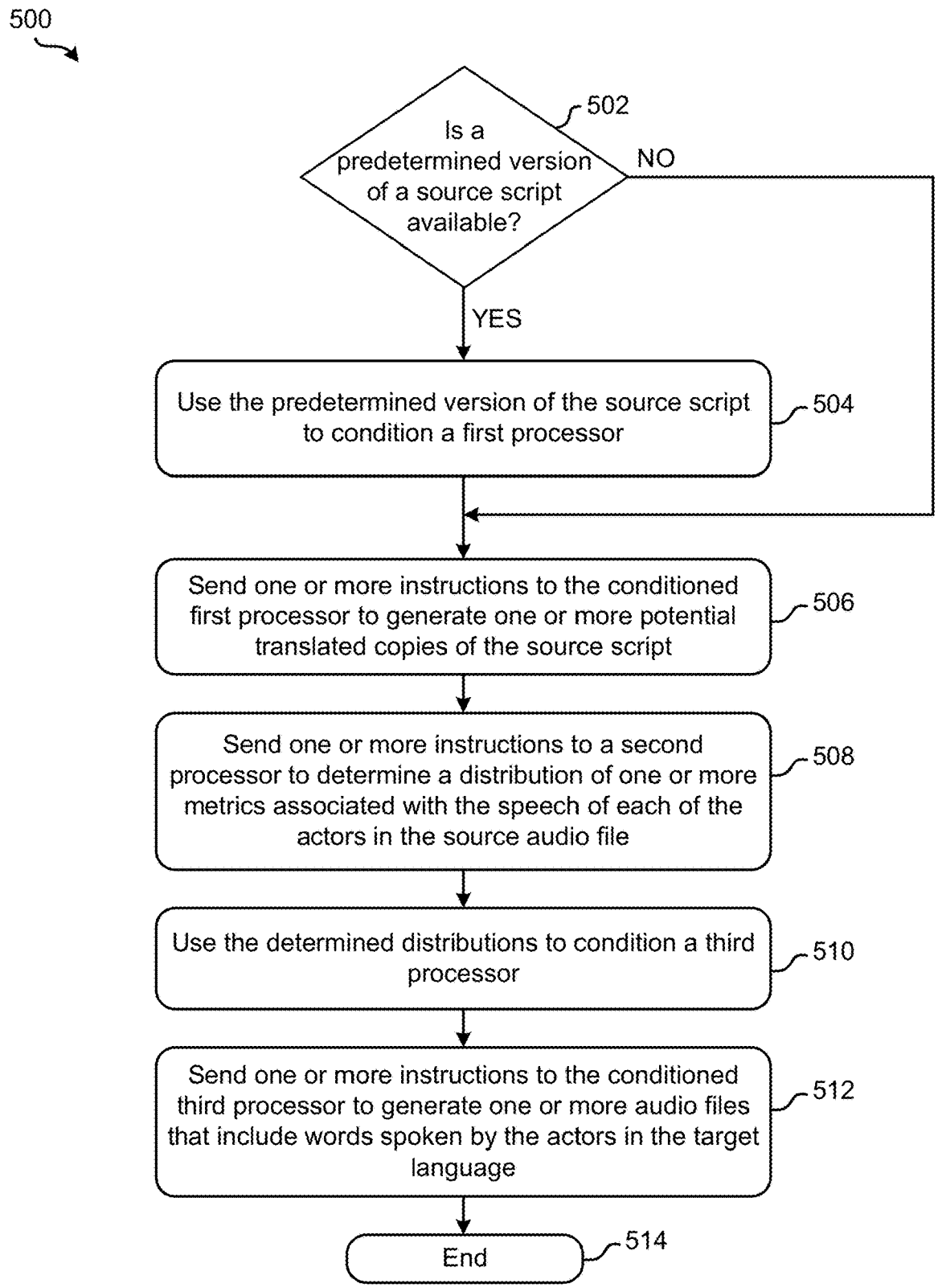
FIG. 5A is a flowchart of a method, in accordance with one embodiment.
Figure 5B:
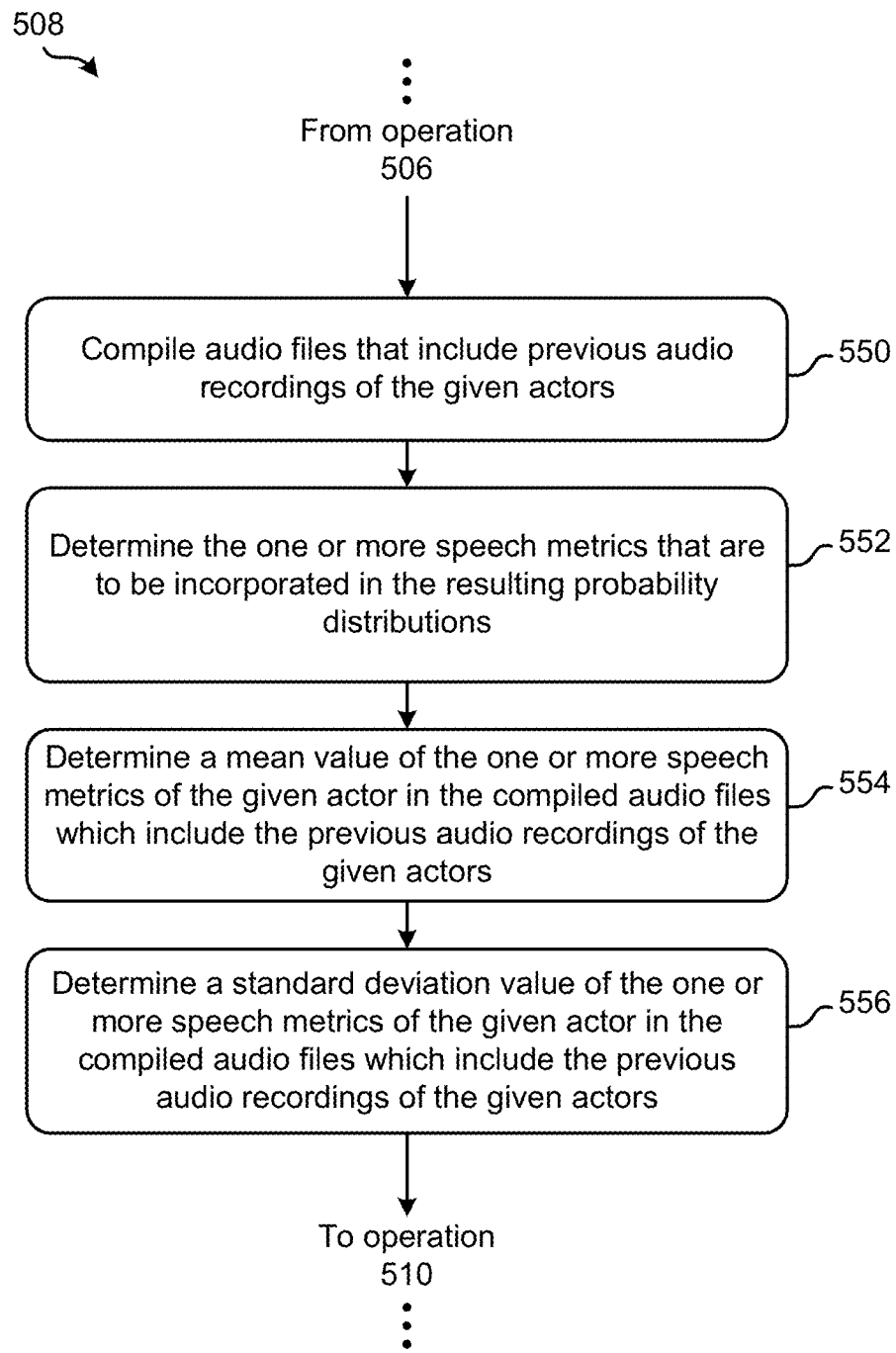
FIG. 5B is a flowchart of sub-processes for one of the operations in the method of FIG. 5A, in accordance with one embodiment.

Referring momentarily now to FIG. 5B, exemplary sub-processes of determining a distribution of one or more metrics associated with the speech of each of the actors are illustrated in accordance with one embodiment. It follows that one or more of the sub-processes in FIG. 5B may be used in the process of satisfying operation 508 of FIG. 5A. However, it should be noted that the sub-processes of FIG.

5B are illustrated in accordance with one embodiment which is in no way intended to limit the invention.

As shown, sub-operation 550 includes compiling audio files that include previous audio recordings of the given actors. As noted above, these audio files that are compiled preferably include the source audio file from the source film, and may also include additional recordings that are associated with the same actors. For instance, audio files may be extracted from past films, deleted takes, previous auditions, etc. and compiled with each other and the source audio file, e.g., in memory.

Sub-operation 552 further includes determining the one or more speech metrics that are to be incorporated in the resulting probability distributions. In other words, sub-operation 552 includes identifying which speech metrics are of interest. In some approaches the speech metrics of interest may be identified in an initial request received from a user. For instance, the predetermined version of the source script may even identify certain ones of the speech metrics which are of interest to the user. In other approaches, the speech metrics of interest may be randomly selected, based on industry standards, selected based on past requests, etc.

Sub-operation 554 further includes determining a mean value of the one or more speech metrics of the given actor in the compiled audio files which include the previous audio recordings of the given actors. The mean values are thereby preferably determined based on at least the source audio file. The mean value of each of the one or more speech metrics may also be determined using different processes depending on the desired approach. For instance, in some approaches the mean value may be determined for each of the speech metrics by calculating a weighted average, an arithmetic mean, a geometric mean, a harmonic mean, etc. Moreover, the determined mean values for the speech metrics may be stored in memory for further use.

Proceeding now to sub-operation 556, a standard deviation value of the one or more speech metrics of the given actor in the compiled audio files which include the previous audio recordings of the given actors is also determined. It again follows that the standard deviation values are preferably determined based on at least the source audio file. Moreover, the standard deviation value of each of the one or more speech metrics may be determined using different processes depending on the desired approach. For instance, in some approaches the standard deviation value may be determined for each of the speech metrics by calculating the amount of variation or dispersion between each of the respective speech metrics in the compiled audio files. The determined mean values for the speech metrics may also be stored in memory for further use.

It follows that by evaluating different metrics associated with speech of the actors, e.g., such as intensity, pitch, tone, etc., a processor (e.g., see VAE 432 of FIG. 4A) is formulated to describe a probability distribution for each desired speech metric. These probability distributions that are formulated may further be used at least somewhat differently to generate potential audio files that mimic certain metrics of the source audio file in addition to the underlying contextual message. Moreover, each of the potential audio files that are generated correspond to a different one of the potential translated copies of the source script, previously generated in response to the one or more instructions sent in operation 506 of FIG. 5A, e.g., as will soon become apparent.

Returning now to FIG. 5A, method 500 proceeds from operation 508 to operation 510. There, operation 510 includes using the determined distributions to condition a third processor. In other words, the probability distributions determined in operation 508 are used to train a third processor. The third processor typically includes a TTS module (e.g., see 428 of FIG. 4A) which is capable of utilizing the probability distributions at least somewhat differently to generate potential audio files which mimic certain metrics of the source audio file. Accordingly, operation 512 includes sending one or more instructions to the conditioned third processor to generate one or more audio files that include words spoken by the actors in the target language.

Again, while the third processor is capable of utilizing the probability distributions at least somewhat differently to generate potential audio files which mimic certain metrics of the actors' voices in the source audio file, e.g., such as intensity, pitch, tone, etc., the actual words spoken by the actors in each of the generated audio files directly correspond to words in a respective one of the generated potential translated copies of the source script. In other words, while the actual delivery of the specific lines included in each of the potential translated copies of the source script may vary such that the intensity, pitch, tone, etc., of the actors differ between the potential audio files that are generated, the specific words that are spoken therein directly correlate to a respective one of the generated potential translated copies of the source script.

Certain ones of the speech metrics may be a closer match to the body language of the actors in the source video file, and may thereby result in a more desirable match. It follows that various ones of the approaches included herein are concerned with matching the actual words spoken in an audio file with the lip movements of the actors in the source video file, as well as matching the speech metrics with the body language of the actors in the source video file. This ultimately produces a much more accurately dubbed film while significantly reducing the resources consumed in order to do so.

Accordingly, operation 512 further includes sending one or more instructions to merge one of the potential audio files with the source video file. As mentioned above, the process of selecting a potential audio file to merge with the source video file preferably involves comparing the actual words spoken in each of the potential audio files with the lip movements of the actors in the source video file, in addition to comparing the speech metrics with the body language of the actors in the source video file. This desirably ensures that both the underlying contextual message, and the corresponding unique performances of the actors are conveyed to the target audience in the resulting film, thereby forming an accurately dubbed media file. It should also be noted that the source video file may be extracted from a source film as a result of passing the source film to a video extraction module that is capable of separating the source video file from the source audio file, e.g., as would be appreciated by one skilled in the art upon reading the present description.

The process of merging one of the potential audio files with the source video file may be performed by an evaluation module (e.g., see 440 of FIG. 4A). The evaluation module may evaluate each respective pair of the potential audio files as well as the potential translated copies of the source script with respect to (e.g., in comparison to) the source video file. Once again, this evaluation may incorporate the actual words spoken in each of the potential audio files with the lip movements of the actors in the source video file, in addition to the speech metrics with the body language of the actors in the source video file. The evaluation module is thereby able to identify one of the respective pairs of potential audio files and potential translated copies as a closest match to movements of the actors in the video file.

In some approaches, the evaluation module is able to identify one of the respective pairs as a closest match to movements of the actors in the video file by comparing the mean and standard deviation values associated with each respective pair of the potential audio files and potential translated copies. Thus, a pair determined to have speech metrics that are a closest match to the information provided in the predetermined version of the source script may thereby be selected. According to an example, which is in no way intended to limit the invention, the evaluation module may incorporate LipGAN to assist in the synthesizing of actor movements in the source video file (e.g., lip movements) with a selected one of the potential audio files. In other words, a LipGAN model may be used to generate natural looking lip movements for the actors in the video file.

From operation 512, the flowchart of FIG. 5A proceeds to operation 514, whereby method 500 may end. However, it should be noted that although method 500 may end upon reaching operation 514, any one or more of the processes included in method 500 may be repeated in order to producing additional dubbed films. In other words, any one or more of the processes included in method 500 may be repeated in order to produce a film that has been dubbed in a target language.

Returning momentarily to decision 502, in some situations a predetermined version of the source script may not be available. Depending on the situation, a predetermined version may simply not have been made by a user, may no longer be accessible (e.g., as a result of data loss), may not currently be available, etc. Thus, in some situations decision 502 may determine that a predetermined version of a source script is not available. In such situations, method 500 proceeds directly to operation 506, e.g., such that the one or more potential translated copies of the source script may be generated. Because the predetermined version of a source script is not available, the first processor may be conditioned using previous predetermined versions, the source script itself, predetermined user preferences, industry standards, etc.

As noted above, the one or more potential translated copies of the source script may be generated by translating the words in the source script from the source language to the target language at least somewhat differently for each of the potential translated copies. The differences between the potential translated copies that are generated without a predetermined version of the source script may thereby be greater as the potential translated copies do not necessarily include certain portions that are predetermined as being the same. However, a request may even be sent to a user for a predetermined version of the source script in some approaches.

It follows that various ones of the embodiments included herein are desirably able to significantly improve the efficiency and accuracy by which a given video can be dubbed. This is achieved at least in part by translating the source language into the target language with proper usage of the source language vocabulary as desired without losing its linguistic and voice features. This in turn leads to the accurate generation of the video that has the best selected vocabulary of the target language with superior lip sync conditioned on the user's selected vocabulary. It will be visually pleasing for the target language audience to be engaged throughout the dubbed movie without them losing interest.

Moreover, users are given the opportunity to provide input such that the resulting dubbed video is selectively created based on the user's specific preferences. For instance, users are able to select the beam width used to determine how many potential translations are formed of a source script. Some of the approaches included herein are able to achieve these improvements by incorporating machine translation into a video generation model which is able to achieve a better visual and auditory experience for viewers. It follows that various ones of the approaches herein are able to achieve realistic lip animation, which is also synchronized with an audio recording of speech in a desired language.

In preferred situations, this is achieved at least in part as a result of implementing predetermined (e.g., pre-written) scripts. As described above, the predetermined version of a source script may be used during the process of selecting a best translated script. The selected translated script is then passed along with the probabilistic distributions of the actors' speech metrics to a speech synthesis model to retain the voice features of the actors during the language translation of the dubbing process. This helps in retaining the script writer's original ideas as well as native vocabulary while altering the script only at the appropriate places so that script writer's intended ideas are conveyed to the audience and the actor's original voice components are retained. This results in an improved experience for the target viewers.

According to an example, which is in no way intended to limit the invention, one or more of the approaches included herein may be used to recreate dialogue for a film in the native language of a target audience. Accordingly, a script of the film is first translated into the target language. However, the translation objective is not only to auto-translate the dialogue, but also to have it properly synched with that of the original language. Sometimes in the auto-translation process, the basic message is conveyed to the target audience viewing the translated video, but does not capture the original emotions or the cultural and native vocabulary which the film maker had in mind. It is thereby desirable to retain the actors' voice components such as intensity, pitch, and tone during the language translation process.

However, in situations where a predetermined version of a source script is not available, potential translated scripts may be formed using alternate information before being transferred to a video generation module for producing the most desirable lip synchronization in the generated film.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    determining whether a predetermined version of a source script is available, wherein words in the source script are in a source language and words in the predetermined version of the source script are in a target language, wherein the predetermined version of the source script identifies specific ones of the words in the predetermined version that are to be retained in a generated script, wherein the words in the source script directly correspond to words spoken by actors in a source audio file, the source audio file corresponding to a video file;
    in response to determining that the predetermined version of the source script is available, using the predetermined version of the source script to condition a first processor;
    sending one or more instructions to the conditioned first processor to generate a translated copy of a first version of the source script by translating words in the first version of the source script from the source language to the target language;
    sending one or more instructions to a second processor to determine a distribution of one or more metrics associated with speech of the actors in the source audio file;
    using the distributions to condition a third processor;
    sending one or more instructions to the conditioned third processor to generate a plurality of different potential audio files and a number of potential translated copies of the first version of the source script, the potential audio files including words spoken in the target language,
    wherein the words spoken in the potential audio files directly correspond to words in the generated translated copy of the first version of the source script;
    evaluating each respective pair of the potential audio files and the potential translated copies of the first version of the source script;
    identifying one of the respective pairs as a closest match to lip movement of the actors in the video file that corresponds with the source audio file; and
    sending one or more instructions to merge the potential audio file of the identified respective pair with the video file.

2. The computer-implemented method of claim 1, comprising:
    in response to determining that a second version of the source script is available, using the second version of the source script to condition the first processor,
    wherein words in the first version of the source script are in a source language and words in the second version of the source script are in a target language,
    wherein the words in the first version of the source script directly correspond to words spoken by the actors in the source audio file.

3. The computer-implemented method of claim 2, wherein each of the number of potential translated copies of the first version of the source script include the specific ones of the words in the target language that are identified in the predetermined version of the source script.

4. The computer-implemented method of claim 1, wherein determining the distribution of the one or more metrics associated with the speech of the actors in the source audio file includes, for each of the actors:
    compiling audio files that include previous audio recordings of the given actor;
    determining a mean value of the one or more speech metrics of the given actor in the source audio file as well as the speech of the given actor in the compiled audio files; and
    determining a standard deviation value of the one or more speech metrics of the given actor in the source audio file as well as the speech of the given actor in the compiled audio files.

5. The computer-implemented method of claim 4, wherein the one or more speech metrics of the actors in the source audio file are selected from the group consisting of: intensity, pitch, and tone.

6. The computer-implemented method of claim 1, wherein the first processor is a text summarizer module.

7. The computer-implemented method of claim 6, wherein the second processor is a Variational Auto Encoder.

8. The computer-implemented method of claim 7, wherein the third processor is a text to speech module.

9. A computer program product comprising a computer readable storage medium having program instructions embodied therewith, the program instructions readable and/or executable by a processor to cause the processor to:
    determine, by the processor, whether a predetermined version of a source script is available, wherein words in the source script are in a source language and words in the predetermined version of the source script are in a target language, wherein the predetermined version of the source script identifies specific ones of the words in the predetermined version that are to be retained in a generated script, wherein the words in the source script directly correspond to words spoken by actors in a source audio file, the source audio file corresponding to a video file;
    in response to determining that a predetermined version of the source script is available, use, by the processor, the predetermined version of the source script to condition a first processor;
    send, by the processor, one or more instructions to the conditioned first processor to generate a translated copy of a first version of the source script by translating words in the first version of the source script from the source language to the target language;
    send, by the processor, one or more instructions to a second processor to determine a distribution of one or more metrics associated with speech of the actors in the source audio file;
    use, by the processor, the distributions to condition a third processor;
    send, by the processor, one or more instructions to the conditioned third processor to generate a plurality of different potential audio files and a number of potential translated copies of the first version of the source script, the potential audio files including words spoken in the target language, wherein the words spoken in the potential audio files directly correspond to words in the generated translated copy of the first version of the source script;

evaluate, by the processor, each respective pair of the potential audio files and the potential translated copies of the first version of the source script;

identify, by the processor, one of the respective pairs as a closest match to lip movement of the actors in the video file that corresponds with the source audio file; and send, by the processor, one or more instructions to merge the potential audio file of the identified respective pair with the video file.

10. The computer program product of claim 9, the program instructions readable and/or executable by the processor to cause the processor to:

in response to determining that a second version of the source script is available, use, by the processor, the second version of the source script to condition the first processor, wherein words in the first version of the source script are in a source language and words in the second version of the source script are in a target language, wherein the words in the first version of the source script directly correspond to words spoken by the actors in the source audio file.

11. The computer program product of claim 10, wherein each of the number of potential translated copies of the source script include the specific ones of the words in the target language that are identified in the predetermined version of the source script.

12. The computer program product of claim 9, wherein determining the distribution of the one or more metrics associated with the speech of the actors in the source audio file includes, for each of the actors:

compiling audio files that include previous audio recordings of the given actor;

determining a mean value of the one or more speech metrics of the given actor in the source audio file as well as the speech of the given actor in the compiled audio files; and determining a standard deviation value of the one or more speech metrics of the given actor in the source audio file as well as the speech of the given actor in the compiled audio files.

13. The computer program product of claim 12, wherein the one or more speech metrics of the actors in the source audio file are selected from the group consisting of: intensity, pitch, and tone.

14. The computer program product of claim 9, wherein the first processor is a text summarizer module.

15. The computer program product of claim 14, wherein the second processor is a Variational Auto Encoder.

16. The computer program product of claim 15, wherein the third processor is a text to speech module.

17. A system, comprising:
a processor; and
logic integrated with the processor, executable by the processor, or integrated with and executable by the processor, the logic being configured to:
determine whether a predetermined version of a source script is available, wherein words in the source script are in a source language and words in the predetermined version of the source script are in a target language, wherein the predetermined version of the source script identifies specific ones of the words in the predetermined version that are to be retained in a generated script, wherein the words in the source script directly correspond to words spoken by actors in a source audio file, the source audio file corresponding to a video file;
in response to determining that a predetermined version of the source script is available, use the predetermined version of the source script to train a first processor;
send one or more instructions to the conditioned first processor to generate a translated copy of a first version of the source script by translating words in the first version of the source script from the source language to the target language;
send one or more instructions to a second processor to determine a distribution of one or more metrics associated with speech of the actors in the source audio file;
use the distributions to condition a third processor;
send one or more instructions to the conditioned third processor to generate a plurality of different potential audio files and a number of potential translated copies of the first version of the source script, the potential audio files including words spoken in the target language,
wherein the words spoken in the potential audio files directly correspond to words in the generated translated copy of the first version of the source script;
evaluate each respective pair of the potential audio files and the potential translated copies of the first version of the source script;
identify one of the respective pairs as a closest match to lip movement of the actors in the video file that corresponds with the source audio file; and
send one or more instructions to merge the potential audio file of the identified respective pair with the video file.

18. The system of claim 17, wherein determining the distribution of the one or more metrics associated with the speech of the actors in the source audio file includes, for each of the actors:

compiling audio files that include previous audio recordings of the given actor;

determining a mean value of the one or more speech metrics of the given actor in the source audio file as well as the speech of the given actor in the compiled audio files; and determining a standard deviation value of the one or more speech metrics of the given actor in the source audio file as well as the speech of the given actor in the compiled audio files.

19. The system of claim 18, wherein the one or more speech metrics of the actors in the source audio file are selected from the group consisting of:
intensity, pitch, and tone.

* * * * *